Feb. 24, 1953     H. B. DERI     2,629,836
ENCLOSED ARC LAMP
Filed March 24, 1949

Inventor
HUBERT B. DERI

By H. L. Mackey
Attorney

Patented Feb. 24, 1953

2,629,836

UNITED STATES PATENT OFFICE 2,629,836

ENCLOSED ARC LAMP

Hubert B. Deri, Rye, N. Y., assignor to General Precision Laboratory Incorporated, a corporation of New York Application March 24, 1949, Serial No. 83,129

14 Claims. (Cl. 313—44)

The present invention relates to an enclosed arc lamp of the type wherein the major portion of the light emitted thereby is confined to the negative or cathode electrode and the region immediately contiguous thereto.

In general such a lamp consists of a cathode having a relatively restricted exposed area composed of a material having high heat resisting properties and an anode of relatively larger size composed of a metal having a high melting point and low vapor pressure enclosed in a vacuum-tight vessel which is filled with an inert gas.

Devices of this general nature have been heretofore proposed but have incorporated the electrodes in a glass envelope and have therefore suffered the disadvantage of requiring an envelope of extreme size or water cooling of the anode when high power lamps are constructed.

Such large size and/or water cooling has been required because the anode must necessarily dissipate a considerable quantity of heat. Where water cooling has not been resorted to because of its obvious disadvantages, the only means by which the heat of the anode may be dissipated is by radiation and conduction of the gas contained within the envelope. When, however, high power lamps of this type are constructed say of a 1000 watts and upward it has been discovered that the heat radiated by the anode is so intense that even the hardest glasses will soften unless they are removed a considerable distance from the anode. This, then, requires that any glass envelope used to enclose the electrode and to contain the inert gas in which the lamp is operated must have a relatively large diameter. The result is that lamps in the higher power category become exceedingly cumbersome and the applications to which they may be put are greatly limited by their excessive size.

It is one of the essential purposes of the present invention, therefore, to provide a lamp of this general type which is restricted in size so that it is adaptable for a greater variety of uses and can be used in motion picture projectors, slide projectors and the like.

To this end the instant invention contemplates the provision of a metal envelope which is in direct and intimate contact with the anode. Thus the heat of the anode is rapidly conducted to the atmosphere by the high heat conductivity of the metal anode and the envelope. Likewise it is contemplated that the necessary cooling of the anode may be hastened by cooling fins fastened to the exterior of the metal enclosure and that these fins may be subjected to a forced draft as by a fan or the like where such is necessary.

It is another purpose of the present invention to provide a lamp of this general type having a cathode composed of a material of high intrinsic brightness and a high resistance to thermal shock so that the lamp is at once relatively efficient in operation and at the same time has a comparatively long life.

A still further purpose of the instant invention resides in the use of a gas such that cathode sputtering is greatly reduced thus lessening the clouding of the glass window through which the light from the cathode is projected, greatly increasing the life of the lamp and its efficiency of operation over an extended period of time.

The particular nature of the invention will be more clearly understood from the following detailed description taken together with the attached drawings in which.

Figure 1:
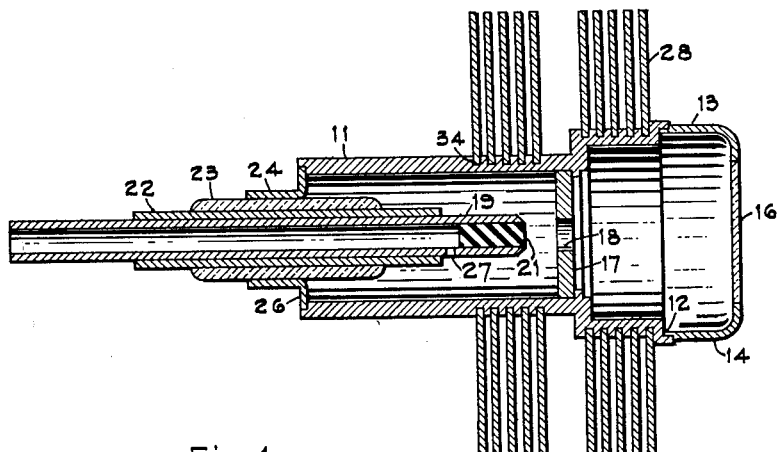
Figure 1 is a longitudinal section of one form of the invention.

Referring now to Fig. 1 a metallic container 11 of copper, brass or other good heat conducting material is provided at one end with an internal channel 12 to which there is sealed a cap member 13.

The cap member 13 is generally cup shaped in configuration and consists of a body portion 14 to which a glass window 16 is hermetically sealed. The window 16 is preferably composed of a borosilicate glass and since this window is sealed to the container 11 through the medium of the body portion 14 of the cap member 13 it is desirable that the body portion 14 have substantially the same coefficient expansion over the range of temperatures to be expected as the glass window.

Various alloys having such characteristics are known in the art such as the iron, nickel, cobalt, manganese alloys having the general proportions of 23% to 28% nickel, 17% to 23% cobalt, 0 to .5% manganese and the remainder iron and the body portion 14 may be composed of such a material.

The cap member 13 is sealed to the container 11 by silver soldering, welding or any other suitable means which will form a gas tight joint.

Of course it will be recognized that other methods known to the art for sealing glass members to metallic articles may be used with equal efficacy.

Internally of the container 11 and in intimate contact with the walls thereof, there is mounted an anode 17 generally disc shaped in configuration and provided with a central aperture 18 through which the light generated at the cathode may be projected towards the window 16. The anode 17 for best operation should be composed of a material which has a high melting point and low vapor pressure and at the same time is a good electrical and thermal conductor and is easily "degassed," thus it is preferable that this element be composed of tungsten or molybdenum although other materials may also be found to be suitable.

The cathode utilized in the present invention which constitutes the predominate source of light emission consists of a tube 19 of molybdenum or other suitable material into the end of which is inserted a light emitting material 21.

The cathode is sealed to and electrically insulated from the container 11, to which the anode is connected by its intimate contact therewith, by a seal which comprises a tube 22 composed of the iron, nickel, cobalt, manganese alloy previously described, silver soldered or welded to the tube 19. Surrounding the tube 22 and sealed thereto is a casing or sheath of boro silicate glass 23 which in turn is sealed to a cylindrical member 24 composed of iron, nickel, cobalt, manganese alloy. Other well known types of seals may, of course, also be used to advantage as hereinbefore stated.

The member 24 is provided at one end with a flange 26 which is hermetically sealed to the container 11 by silver soldering, welding or the like and thus the cathode is at once sealed to the container 11 and electrically insulated therefrom by the interposition of the glass sheath 23.

In order that the lamp of the invention may have the highest possible intrinsic brightness, the light emitting material 21 of the cathode is required to have a high melting point, fairly low thermal conductivity, and reasonably high thermionic emission at its temperature of operation, say, 3000° K.

Tests on various substances which reasonably fall within the category of possible suitable materials indicate that hafnium oxide and zirconium oxide far exceed all others in intrinsic brightness and thus are suitable for use in the instant invention. Hafnium oxide alone may be used with excellent results but has the disadvantage of high cost so that a mixture of hafnium oxide and zirconium oxide may be preferred where large cathodes are involved.

Pure zirconium oxide has a high intrinsic brightness but when used alone suffers the disadvantage of poor resistance to thermal shock, that is, it has an irregular expansion at between 1100° to 1250° C. apparently caused by a sudden change in crystalline structure. This causes the material to develop cracks and portions of the cathode to shatter off resulting in a loss of cathode material.

It has been discovered, however, that so called "stabilized" zirconium oxide does not suffer this disadvantage and since its intrinsic brightness is equal to if not better than pure zirconium oxide, its use in the present invention is highly advantageous, both as to the cost of the material used and the results obtained therefrom.

Stabilized zirconium oxide is more fully described as to its composition and method of manufacture in an article by Carl E. Curtis entitled "Development of zirconia resistant to thermal shock" appearing in volume 30 of The Journal of The American Ceramic Society at pages 180–196 and it is sufficient for present purposes to merely point out that this material consists of zirconium oxide with small additions of calcium oxide, magnesium oxide or cesium oxide or combinations of calcium oxide and thorium oxide, calcium oxide and beryllium oxide, beryllium oxide and cesium oxide or calcium oxide and magnesium oxide, the use of calcium oxide or a combination of calcium oxide and magnesium oxide being the more usual.

Whatever material is used for the light emitting substance 21 of the cathode it may be formed either by packing the substance in powdered form into the end of the tube 19 or by preforming the material in a block of suitable size and shape and forcing the preformed block into the end of the tube 19.

The lamp chamber may be exhausted through the tube 19, the exhaust port 27 of which communicates with the interior of the container 11 at a point forwardly of the tube 22 and rearwardly of the light emitting material 21. After being exhausted the lamp chamber is filled with an inert gas at a pressure of approximately one atmosphere although it is also contemplated that high pressures of several atmospheres or more may be used to secure increased brightness. After flushing, if necessary, and filling with the desired inert gas the lamp may then be sealed by pinching the tube 19 and spot welding, soldering or otherwise so that the whole structure is hermetically sealed.

Various of the inert gases may be used such as argon, neon, krypton, nitrogen and helium with varying beneficial results. Tests indicate, however, that helium as the gas filling for the lamp possesses advantages not found when other of the inert gases are used.

When for example, a gas such as argon is used a phenomenon which is suggestive of "cathode sputtering" is found to take place, that is, after being operated for a period of time a slight deposit may be noted on the window 16 and this results in a reduction of the amount of light transmitted therethrough thus reducing the efficiency of the lamp. On the other hand this action does not occur when helium is used as the atmosphere in which the arc operate and the lamp may be operated for long periods without clouding the window to an appreciable extent. For example, when argon has been used the light transmission of the window 16 has been found to decrease to as low as 60%, while in some lamps operated in an atmosphere of helium the light transmission starting from a value of 94% for clean surfaces and comprising only reflection losses from its two surfaces has been found to decrease to only 93% after operation over a much longer period than was represented by period of operation with argon.

It has also been discovered that when helium is used in high-powered lamps a somewhat greater brightness is obtained than when argon is used so that helium is particularly advantageous from all standpoints.

In operation of a lamp such as herein described, a high potential is momentarily applied between the cathode and anode in any known manner to start the arc. After the arc is started a relatively low direct current voltage is applied between the anode and cathode, the positive terminal being connected to the container 11 which is in turn connected to the anode by intimate contact therewith and the negative terminal being connected to the cathode through the tube 19.

In operation the discharge of the lamp may be compared to that of the ordinary arc except that the illumination is essentially confined to a small spot substantially the diameter of the exposed end of the cathode. The cathode is comparatively small and the heat conduction from the hot spot on the cathode to its supporting structure is small which causes the cathode temperature to build up to a very high value.

It is believed that the ion bombardment of the cathode reduces the oxide emitting material, forming a thin film of zirconium, hafnium or combination thereof as the case may be on the face of the cathode. The light is produced by the incandescence of this hot metal film, by a layer of metallic vapor in close proximity to the end of the cathode and by recombination of positive ions with electrons. These sources of light are all very close together and are practically indistinguishable except by special means of analysis. When viewed the light appears to come from the cathode end surface. Of course, there is some light produced by the gas in the lamp and the anode even though it is large, may be heated sufficiently to radiate visible light at the edges of the aperture 18 but these latter sources are for all intents and purposes negligible.

A major portion of the heat produced in the lamp, however, resides in the relatively large anode and in order that the lamp shall operate efficiently this heat must be dissipated as rapidly as possible.

By providing a metallic container which in effect is but an extension of the anode because of the intimate contact therebetween the instant invention provides a large radiating surface which nevertheless occupies a small space to perform the vital function of cooling the anode.

As further assistance in providing the desired radiating surface and its consequent essential cooling of the anode, the instant invention contemplates the provision of cooling fins 28.

Figure 2:
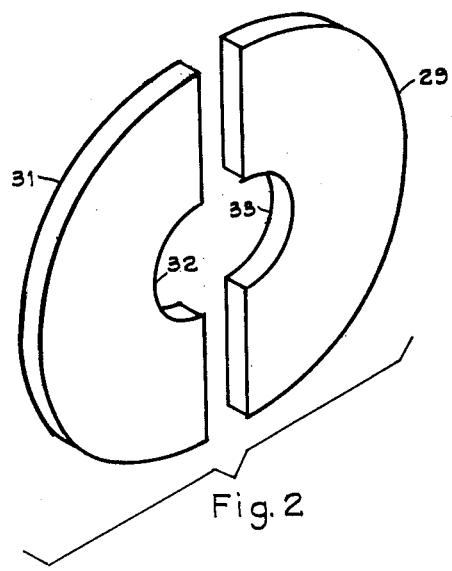
Figure 2 is a detailed view of the cooling fins of Fig. 1 illustrating their manner of assembly.

As indicated in Fig. 2 these fins may be made in two semi-circular sections 29 and 31 having arcuate openings 32 and 33 of a size to correspond to the root diameter of circular grooves 34 cut in the external surface of the container 11. In assembling, the two halves of a fin are slipped over the container 11 in the desired groove and the two halves silver soldered to the container 11.

Of course, other well known means of attaching radiating fins may also be employed if desired, the above being set forth merely as one method which has the advantage of ease in assembly.

What is claimed is:

1. In an enclosed arc lamp, a metallic tubular envelope having a transparent window sealed in an end wall thereof, a cathode assembly insulatingly sealed in the other end of said envelope comprising a metallic tubular support member having a light emissive material filling at least one end of said support member, a disc shaped metallic anode positioned between said cathode and said window and having its periphery in intimate engagement with the interior surface of said metallic envelope, an aperture in said anode for transmission of light from said cathode therethrough and a filling of inert gas in said envelope.

2. An enclosed arc lamp according to claim 1 in which cooling fins are positioned exteriorly of said metallic envelope.

3. An enclosed arc lamp according to claim 1 in which said light emissive material is composed of stabilized zirconium oxide and said inert gas comprises helium.

4. In an enclosed arc lamp, a cathode electrode comprising, a holder and a light emissive material inserted therein, a metallic envelope enclosing said cathode electrode, a transparent window sealed in said envelope and so positioned that the light emitted by said light emissive material may be projected therethrough, a filling of inert gas in said envelope, an anode of relatively large size as compared to said cathode positioned between said cathode and said transparent window and in intimate contact with said metallic envelope, said anode being provided with an opening therein through which the light generated by said cathode is emitted.

5. An enclosed arc lamp according to claim 4, in which said light emissive material is composed of stabilized zirconium oxide.

6. An enclosed arc lamp according to claim 4 in which said light emissive material is composed of stabilized zirconium oxide and said inert gas is comprised of helium.

7. An enclosed arc lamp according to claim 4 in which said light emissive material is composed of hafnium oxide.

8. An enclosed arc lamp according to claim 4 in which said light emissive material is composed of a mixture of zirconium oxide and hafnium oxide.

9. In an enclosed arc lamp, a cathode electrode comprising, a metallic holder, an oxide material having a high melting point inserted in one end thereof, a metallic envelope enclosing said cathode electrode, a transparent window sealed to said envelope and so positioned that the light emitted by said oxide material may be projected therethrough, a filling of inert gas in said envelope, a metallic anode of large size as compared to said cathode positioned between said cathode and said window, said anode being in electrical and heat conductive contact with said metallic envelope and being provided with an opening through which the light generated by said cathode is emitted.

10. An enclosed arc lamp according to claim 9 in which said oxide material is composed of stabilized zirconium oxide.

11. An enclosed arc lamp according to claim 9 in which said oxide material is composed of stabilized zirconium oxide and said inert gas is composed of helium.

12. An enclosed arc lamp according to claim 11 in which said metallic envelope has radiating members mounted exteriorly thereof.

13. An enclosed arm lamp according to claim 9 in which said oxide material is composed of hafnium oxide.

14. An enclosed arc lamp according to claim 9 in which said oxide material is composed of zirconium oxide and hafnium oxide.

HUBERT B. DERI.

REFERENCES CITED

The following references are of record in the file of this patent:

UNITED STATES PATENTS

| Number | Name | Date |
| --- | --- | --- |
| 690,952 | Hewitt | Jan. 14, 1902 |
| 1,189,738 | Richardson | July 4, 1916 |
| 1,643,126 | Lorenz | Sept. 2, 1927 |
| 1,655,966 | Lorenz | Jan. 10, 1928 |
| 1,898,032 | Cloud | Feb. 21, 1933 |
| 1,905,153 | Cloud | Apr. 25, 1933 |
| 1,928,002 | Berg | Sept. 26, 1933 |
| 1,954,958 | Smythe | Apr. 17, 1934 |
| 2,181,924 | Spanner | Dec. 5, 1939 |
| 2,249,672 | Spanner | July 15, 1941 |
| 2,397,982 | Salzberg | Apr. 9, 1946 |
| 2,414,450 | Chevigny | Jan. 21, 1947 |
| 2,453,118 | Buckingham | Nov. 9, 1948 |